United States Patent
Matsen et al.

(10) Patent No.: US 9,314,975 B1
(45) Date of Patent: Apr. 19, 2016

(54) HIGH RATE FABRICATION OF COMPRESSION MOLDED COMPONENTS

(71) Applicant: The Boeing Company, Chicago, IL (US)

(72) Inventors: Marc R. Matsen, Seattle, WA (US); Mark A. Negley, Bellevue, WA (US); William C. Dykstra, Rockford, MI (US); Glen L. Smith, Dearborn, MI (US); Robert J. Miller, Fall City, WA (US)

(73) Assignee: The Boeing Company, Chicago, IL (US)

( * ) Notice: Subject to any disclaimer, the term of this patent is extended or adjusted under 35 U.S.C. 154(b) by 483 days.

(21) Appl. No.: 13/870,111

(22) Filed: Apr. 25, 2013

(51) Int. Cl.
| | |
|---|---|
| *B29C 70/34* | (2006.01) |
| *B29C 43/52* | (2006.01) |
| *B29C 51/42* | (2006.01) |
| *B29C 70/42* | (2006.01) |
| B29C 33/06 | (2006.01) |
| B29C 43/58 | (2006.01) |
| B29C 43/56 | (2006.01) |
| B29C 35/08 | (2006.01) |

(52) U.S. Cl.
CPC ............ *B29C 70/345* (2013.01); *B29C 43/52* (2013.01); *B29C 51/421* (2013.01); *B29C 70/42* (2013.01); *B29C 33/06* (2013.01); *B29C 2035/0811* (2013.01); *B29C 2043/568* (2013.01); *B29C 2043/5816* (2013.01)

(58) Field of Classification Search
USPC .................................. 264/320, 322, 403, 487
See application file for complete search history.

(56) References Cited

U.S. PATENT DOCUMENTS

| | | | | |
|---|---|---|---|---|
| 3,479,419 A | * | 11/1969 | Hochhauser | ......... C08K 5/0025 219/605 |
| 4,657,717 A | | 4/1987 | Cattanach et al. | |
| 4,904,436 A | | 2/1990 | Rachal | |
| 5,508,496 A | * | 4/1996 | Hansen | ............... B29C 65/3656 156/272.4 |
| 5,705,795 A | * | 1/1998 | Anderson | ......... B29C 66/73116 156/274.4 |
| 5,717,191 A | * | 2/1998 | Christensen | .......... B29C 66/721 219/603 |
| 5,728,309 A | | 3/1998 | Matsen et al. | |
| 5,756,973 A | * | 5/1998 | Kirkwood | ........... B29C 37/0082 156/272.4 |
| 5,760,379 A | * | 6/1998 | Matsen | ............. B29C 66/73116 219/633 |
| 6,346,210 B1 | * | 2/2002 | Swartz | ..................... A43B 3/28 264/320 |
| 6,528,771 B1 | | 3/2003 | Matsen et al. | |
| 6,602,810 B1 | * | 8/2003 | Christensen | .......... B29C 66/721 264/486 |
| 6,855,917 B2 | * | 2/2005 | Matsen | ................... B29C 33/02 219/634 |

(Continued)

FOREIGN PATENT DOCUMENTS

| | | | |
|---|---|---|---|
| EP | 0335100 A2 | 10/1989 | |
| EP | 1326741 B1 | 8/2006 | |
| WO | WO 0185827 A2 * | 11/2001 | .......... B29C 35/0272 |

*Primary Examiner* — Atul P. Khare
(74) *Attorney, Agent, or Firm* — Ostrager Chong Flaherty & Broitman P.C.

(57) ABSTRACT

A method for fabricating a thermoplastic composite component comprises inductively heating a thermoplastic pre-form with a first induction coil by inducing current to flow in susceptor wires disposed throughout the pre-form, inductively heating smart susceptors in a molding tool to a leveling temperature with a second induction coil by applying a high-strength magnetic field having a magnetic flux that passes through surfaces of the smart susceptors, shaping the magnetic flux that passes through surfaces of the smart susceptors to flow substantially parallel to a molding surface of the smart susceptors, placing the heated pre-form between the heated smart susceptors; and applying molding pressure to the pre-form to form the composite component.

20 Claims, 7 Drawing Sheets

(56) References Cited

U.S. PATENT DOCUMENTS

| | | | | |
|---|---|---|---|---|
| 7,024,897 B2* | 4/2006 | Pfaffmann | B21D 26/033 | 148/520 |
| 7,905,128 B2* | 3/2011 | Matsen | B21D 26/02 | 219/634 |
| 8,017,059 B2 | 9/2011 | Matsen et al. | | |
| 8,343,402 B1* | 1/2013 | Matsen | B29C 35/0805 | 264/109 |
| 8,372,327 B2* | 2/2013 | Matsen | B29C 33/06 | 264/258 |
| 8,375,758 B1* | 2/2013 | Matsen | B21D 22/022 | 72/342.7 |
| 8,480,823 B1* | 7/2013 | Matsen | B21D 37/16 | 148/574 |
| 8,865,050 B2* | 10/2014 | Matsen | B29C 35/0288 | 264/348 |
| 8,980,029 B1* | 3/2015 | Nigro | B29C 65/368 | 156/244.17 |
| 2003/0062118 A1* | 4/2003 | Gerhard | B29C 35/0272 | 156/274.4 |
| 2008/0185756 A1 | 8/2008 | Wilkerson et al. | | |
| 2009/0004405 A1* | 1/2009 | Merry | C23C 16/4586 | 427/585 |
| 2010/0086727 A1 | 4/2010 | Katayama et al. | | |
| 2011/0262575 A1 | 10/2011 | Matsen et al. | | |
| 2011/0262701 A1 | 10/2011 | Albertelli | | |
| 2013/0312474 A1* | 11/2013 | Dykstra | B21D 26/02 | 72/60 |
| 2014/0353305 A1* | 12/2014 | Matsen | B64C 3/26 | 219/634 |
| 2015/0231805 A1* | 8/2015 | Chotard | B29C 43/56 | 264/435 |

* cited by examiner

HIGH RATE FABRICATION OF COMPRESSION MOLDED COMPONENTS

GOVERNMENT CONTRACT

The invention disclosed herein was made with support of the United States Government under Contract No. DE-FG36-08GO18135 awarded by the Department of Energy. The Government has certain rights in this invention.

TECHNICAL FIELD

This disclosure generally relates to fabrication of compression molded components and, more specifically, to energy efficient methods for rapidly forming, consolidating and molding fiber reinforced thermoplastic composite materials (referred to as pre-forms) into molded thermoplastic composite components.

BACKGROUND

Fiber reinforced thermoplastic composite components (or parts) have a high strength-to-weight ratio or a high stiffness-to-weight ratio and desirable fatigue characteristics that make them increasingly popular as a replacement for metal in a wide variety of applications. Such components have found expanding applications in, for example, the aerospace, automotive and wind energy industries.

Conventional methods of fabricating thermoplastic composite components include autoclave and hot-press forming. In autoclave processing, prepreg fiber sheets of continuous, woven or chopped reinforcing fibers are formed with an uncured matrix resin impregnated therein. The prepreg sheets are placed (or laid-up) by hand or with fiber placement machines directly upon a tool or die having a forming surface contoured to the desired shape of the completed part, or are laid-up in a flat sheet which is then draped and formed over the tool or die to the contour of the tool. Then, the resin in the prepreg layup is consolidated (i.e., pressed to remove any air, gas, or vapor) and cured (i.e., chemically converted to its final form usually through chain-extension) in a vacuum bag process in an autoclave (i.e., a pressure oven) to complete the part. Autoclave processing is time consuming because of the need for vacuum bagging.

In hot press forming, a prepreg is laid-up, bagged (if necessary) and placed between matched metal tools that include forming surfaces that define the internal, external, or both mold lines of the completed part. The tools and composite prepreg are placed within a press and then the tools and prepreg are heated under pressure to produce a consolidated part. Hot press forming requires high molding pressures of about 1,500 psi, molding temperatures below the melting point of the prepreg to permit unloading in a timely manner, and lower percentages of fiber reinforcements in the prepreg. Lower molding temperatures provide limitations on the strength and stiffness of the component and restrict how thin the walls of the composite components may be.

It is also known to consolidate and mold thermoplastic composite components from a pre-form using an inductively heated consolidation tool, as disclosed in commonly-owned U.S. Pat. No. 8,017,059, the disclosure of which is incorporated by reference herein. In general, a pre-form is placed between first and second electrically conductive tooling dies or molds (usually metal), which are inductively heated and compressed to form a molded thermoplastic composite component. Induction heating is a process in which the mold is heated by electromagnetic induction. During such heating, eddy currents are generated within the metal and the electrical resistance of the metal leads to Joule heating thereof. An induction heater typically comprises an inductor through which a high-frequency alternating current is passed. A susceptor may be used in or adjacent to the pre-form to achieve the necessary heating for consolidation or forming. The susceptor is heated inductively and transfers its heat principally through conduction to the pre-form sandwiched between opposing susceptor facesheets.

Because of the expanding industrial applications for thermoplastic composite components, there is a need to improve processing techniques and facilities to enable widespread manufacture and use of such parts. In particular, there is a need for processes that will enable rapid heating, consolidation, molding and cooling in a controlled manner to increase production rates and volume of lightweight and high quality thermoplastic composite components in an affordable and energy efficient manner.

SUMMARY

The foregoing purposes, as well as others that will be apparent, are achieved generally by providing methods for rapid (i.e., less than about 1 minute) fabrication of thermoplastic composite components from fiber reinforced thermoplastic pre-forms using induction heating with smart susceptors and, more particularly, to rapidly and independently pre-heating both the induction heating tool and the thermoplastic composite pre-form before molding. Molding is done at a processing temperature that may be above the melting temperature of the pre-form to enable higher fiber content and molding pressures about five to ten times lower than molding pressures currently used for consolidation and molding, and to permit fabrication of components with thinner walls, more complicated structures and higher quality.

One aspect of the subject matter disclosed in detail below is a method for fabricating a thermoplastic composite component, comprising: inductively heating a thermoplastic pre-form with a first induction coil to a processing temperature by inducing current to flow in susceptor wires disposed throughout the pre-form, inductively heating smart susceptors in a molding tool to a leveling temperature with a second induction coil, placing the heated pre-form between the heated smart susceptors; and applying molding pressure to the pre-form to form the composite component.

Another aspect of the subject matter disclosed in detail below is a method for fabricating a thermoplastic composite component, comprising: pre-heating a thermoplastic pre-form to a processing temperature, pre-heating smart susceptors in a molding tool to a leveling temperature by applying a high-strength magnetic field having a magnetic flux that passes through surfaces of the smart susceptors and shaping the magnetic flux that passes through surfaces of the smart susceptors to flow substantially parallel to a molding surface of the smart susceptors, placing the heated pre-form between the heated smart susceptors; and applying molding pressure to the pre-form to form the composite component.

In an illustrative embodiment of the composite fabrication method, the method includes forming a thermoplastic composite pre-form with susceptor wires removably disposed throughout the pre-form; positioning the pre-form in a first induction coil to induce current in the susceptor wires and inductively pre-heat the pre-form; positioning first and second flux guidance shells in an induction molding tool comprising a first tooling die having a first die surface and a second tooling die having a second die surface, a first susceptor positioned on the first die surface, a second susceptor positioned on the second die surface, and an integrated induction coil, the flux guidance shells positioned over the first susceptor and the second susceptor; inductively pre-heating the first susceptor and the second susceptor to a leveling temperature with the first and second flux guidance shells in position over the first susceptor and the second susceptor; removing the first and second flux guidance shells from the induction molding tool; placing the pre-heated pre-form between the heated first susceptor and second susceptor; and applying molding pressure to the heated pre-form to form the composite component.

Other objects, features and advantages of the present disclosure will be apparent when the detailed description of preferred embodiments is considered in conjunction with the following drawings.

BRIEF DESCRIPTION OF THE DRAWINGS

Various embodiments will be hereinafter described with reference to drawings for the purpose of illustrating the foregoing and other aspects of the disclosure.

Reference will hereinafter be made to the drawings in which similar elements in different drawings bear the same reference numerals.

DETAILED DESCRIPTION

The following detailed disclosure describes methods and an apparatus for rapidly fabricating light weight, high quality components or parts from fiber reinforced thermoplastic materials (or pre-forms) by inductively pre-heating the pre-form and then consolidating, molding and cooling the pre-heated pre-form in an inductively pre-heated molding tool having matched tooling or forming surfaces with smart susceptors. The pre-form and the molding tool are pre-heated independently. The use of inductive heating using smart susceptors in accordance with this disclosure also has application to other materials depending on the end use application. For example, the methods and apparatus disclosed herein may be used for consolidating and molding composite components that comprise many types of reinforcing fibers embedded in a matrix made of either thermoplastic or thermosetting plastic material, or molding components comprising aluminum or magnesium sheet metal.

Figure 1:
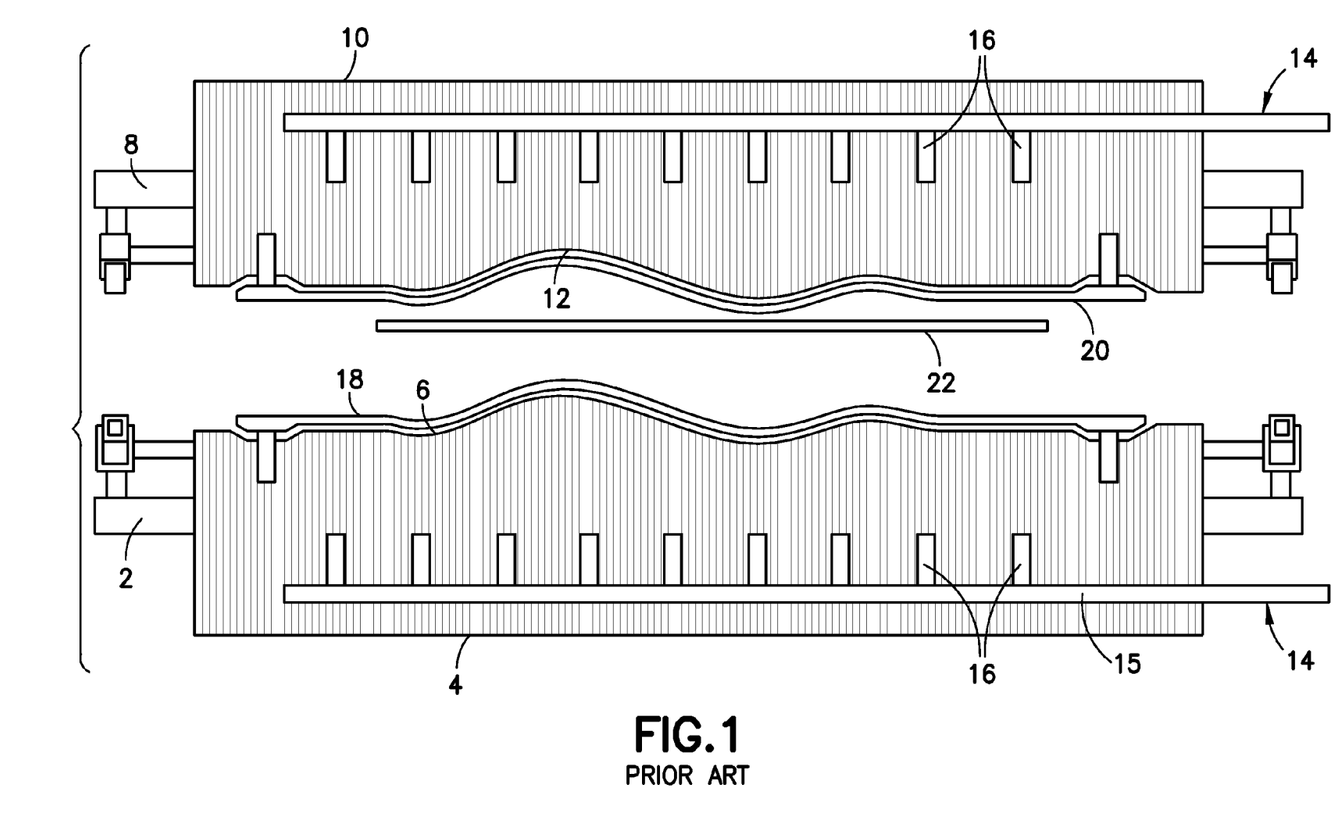
FIG. 1 is a diagram showing a sectional view of portions of a known apparatus, the apparatus comprising upper and lower tool assemblies with matched surfaces designed to consolidate and mold a composite component from a pre-form. The tool assemblies are shown in their refracted positions and the pre-form is shown in an uncompressed state.
Figure 2:
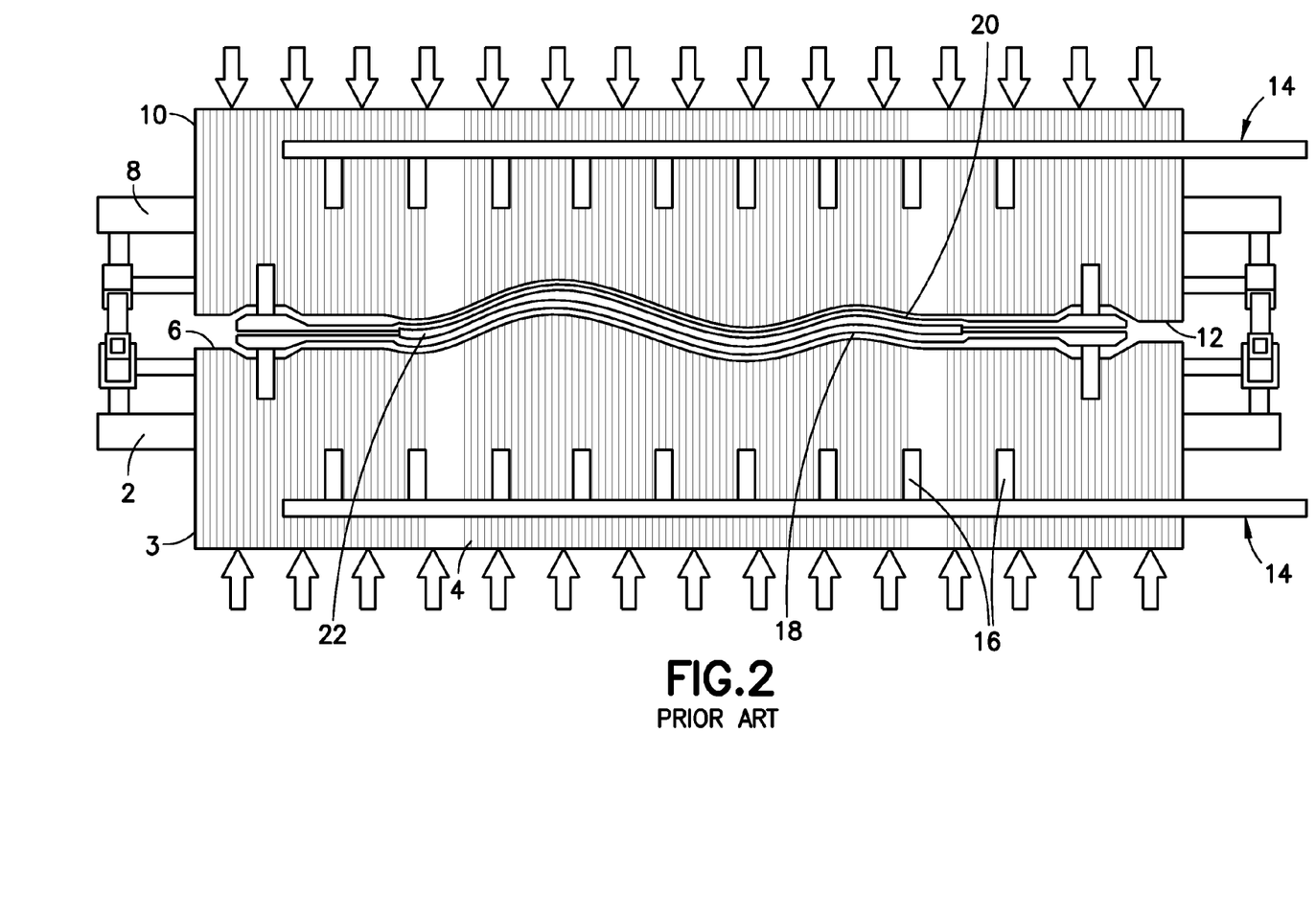
FIG. 2 is a diagram showing a sectional view of the apparatus depicted in FIG. 1, except that the tool assemblies are shown in their extended positions with the pre-form compressed therebetween.

One known apparatus that may be used for matched tool consolidation and molding of pre-forms using the processes disclosed herein is partly depicted in FIGS. 1 and 2. FIG. 1 shows the apparatus in a pre-molding stage, while FIG. 2 shows the apparatus while consolidation and molding is under way. The apparatus comprises a lower die frame 2, a lower tooling die 4 supported by the lower die frame 2 and having a first contoured die surface 6, an upper die frame 8, and an upper tooling die 10 supported by the upper die frame 8 and having a second contoured die surface 12 which is complementary to the first contoured die surface 6. The contoured die surfaces 6 and 12 may define a complex shape different than what is depicted in FIGS. 1 and 2. However, the novel means disclosed herein also have application when the die surfaces are planar. The die frames 2 and 8 act as mechanical constraints to keep the lower and upper tooling dies 4 and 10 together and to maintain the dimensional accuracy of the dies. The die frames 2 and 8 may be coupled to hydraulic, pneumatic or other types of actuators (not shown in FIGS. 1 and 2), which move the dies toward and away from each other between the retracted position shown in FIG. 1 and the extended, tool-closed, position shown in FIG. 2. In addition, one or more induction coils (not shown in FIGS. 1 and 2) may extend through each of the tooling dies 4 and 10 to form an induction heater for raising the temperature of contoured die surfaces 6 and 12. A thermal control system (not shown) may be connected to the coils.

Still referring to FIGS. 1 and 2, the apparatus further comprises a lower susceptor 18 and an upper susceptor 20 made of electrically and thermally conductive material. The susceptors and the induction coils are positioned so that the susceptors can be heated by electromagnetic induction. The lower susceptor 18 may generally conform to the first contoured die surface 6 and the upper susceptor 20 may generally conform to the second contoured die surface 12.

In some cases, it is preferred that the temperature at which a pre-form is consolidated should not exceed a certain temperature. To this end, susceptors 18 and 20 are preferably so-called "smart susceptors". A smart susceptor is constructed of a material, or materials, that generate heat efficiently until reaching a threshold (i.e., Curie) temperature. As portions of the smart susceptor reach the Curie temperature, the magnetic permeability (i.e., how easy it is for magnetic flux to penetrate into the susceptor) of those portions falls to unity (i.e., the susceptor becomes paramagnetic and does not accept any further magnetic flux lines), and those portions become non-magnetic. This drop in magnetic permeability has two effects: it limits the generation of heat by those portions at the Curie temperature, and it shifts the magnetic flux to the lower temperature portions, causing those portions below the Curie temperature to more quickly heat up to the Curie temperature.

Accordingly, thermal uniformity of the heated pre-form during the molding process can be achieved irrespective of the input power fed to the induction coils by judiciously selecting the material for the susceptor. The susceptors are heated by supplying oscillating electrical power to the induction coils by a power supply (not shown). The supplied electrical power produces an oscillating magnetic flux which rapidly heats the susceptors 18 and 20. In a typical implementation of a consolidation and molding process, the pre-form 22 is initially positioned between the upper and lower tooling dies of the stacked tooling apparatus, as shown in FIG. 1, at room temperature. Then, the tooling dies 4 and 10 are moved toward each other, as shown in FIG. 2, until they reach their respective tool-closed positions, and the smart susceptors are heated. During this process, the pre-form will be molded by the opposing contoured (or planar) surfaces of the susceptors 18 and 20.

The consolidation/molding apparatus shown in FIGS. 1 and 2 further comprises a cooling system 14 comprising respective sets of cooling conduits 16 (made, e.g., from SiN tubing) distributed in the tooling dies 4 and 10. Each set of coolant conduits 16 is coupled via respective manifolds to a source of cooling medium, which may be liquid, gas or a gas/liquid mixture such as mist or aerosol. The cooling system can be activated after the pre-form is consolidated and molded to apply the cooling medium to the tooling dies 4 and 10 to quench and cool the back sides of the susceptors 18 and 20, thereby also cooling the pre-form 22 therebetween. The pre-form 22 remains sandwiched between the susceptors for a predetermined period of time until quenching of the pre-form has been achieved. This allows the molded and consolidated pre-form 22 to retain the structural shape which is defined by the contoured surfaces of the susceptors 18 and 20 and a microstructure that provides enhanced strength properties.

After cooling, the actuators move the tool dies apart to the refracted position shown in FIG. 1 to allow removal of the molded composite component from the mold. The molded composite component is removed from the molding without loss of dimensional accuracy when it is cooled at an appropriate property-enhancing rate.

Figure 3:
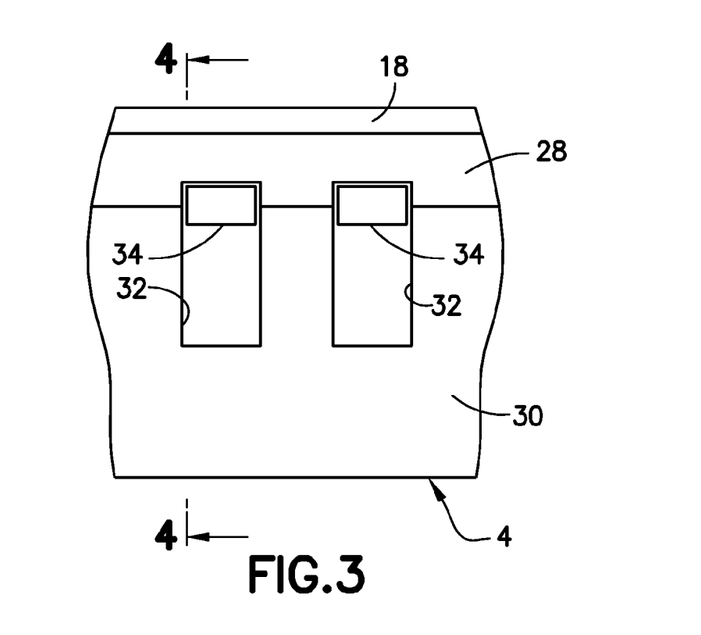
FIG. 3 is a diagram showing an end view of a portion of a lower tooling die in accordance with one embodiment.

FIG. 3 is an end view of a portion of a lower tooling die 4 in accordance with one embodiment. The upper tooling die may have a similar construction. Each tooling die comprises a multiplicity of cavities 32, which may be mutually parallel. FIG. 3 shows only two such cavities 32, the upper portion of each cavity 32 having a portion of a respective turn of an induction coil 34 which passes through the uppermost portion of the cavity.

Figure 4:
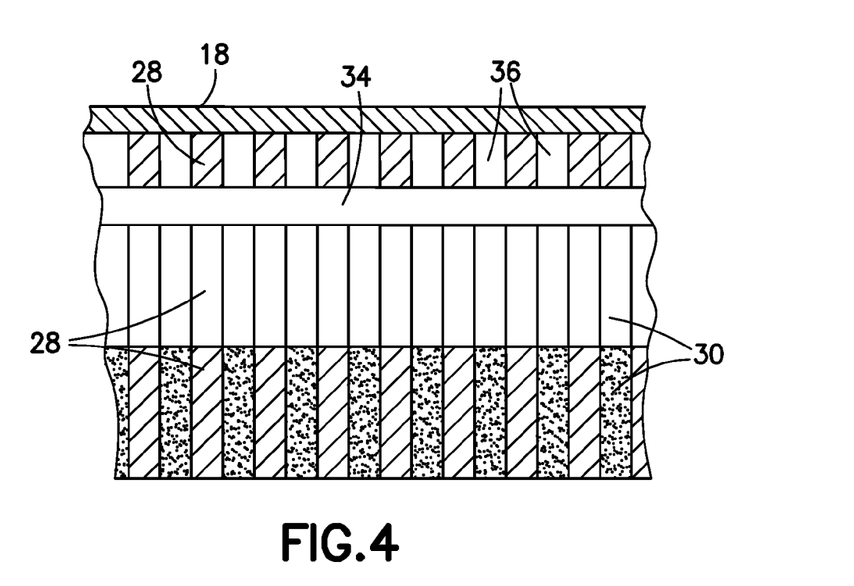
FIG. 4 is a diagram showing a sectional view of a portion of the lower tooling partially depicted in FIG. 3, the section being taken along line 4-4 seen in FIG. 3.

The sectional view shown in FIG. 4 is taken along line 4-4 seen in FIG. 3 and passes through a cavity 32, but not through the portion of inductive coil 34 therein. One or more coils can be used. As the parts requiring fabrication get bigger, it may be necessary to break the coil into multiple coils connected in parallel in order to limit the voltage required by each coil. Without the smart susceptors 18, control of the current (and resulting temperature) to each parallel coil could become problematic. For the sake of simplicity, FIGS. 3 and 4 show a portion of a lower tooling die for which the corresponding portion of the attached susceptor 18 is horizontal rather than angled.

Still referring to FIGS. 3 and 4, the lower tooling die may comprise a lamination of alternating metal (e.g., austenitic stainless steel or an Inconel® austenitic nickel/chromium-based superalloy) plates 28 and dielectric spacers 30 which are trimmed to appropriate dimensions to form a plurality of parallel longitudinal cavities 32 in which the turns of one or more induction coils 34 reside. Each metal plate 28 may have a thickness in the range of about 0.0625 to about 0.5 inch. The stacked metal plates 28 may be attached to each other using clamps, fasteners and/or other suitable means (not shown) known to persons skilled in the art. The stacked metal plates 28 may be selected based on their electrical and thermal properties. The stacked metal plates 28 are typically formed of a strong and rigid material having a melting point well above the consolidation temperature of the pre-form. Additionally, the stacked metal plates 28 can be formed of a material characterized by a low thermal expansion, high thermal insulation, and a low electromagnetic absorption. The stacked metal sheets may be oriented in generally perpendicular relationship with respect to the respective contoured die surfaces. An electrically insulating coating (not shown) may optionally be provided on each side of each stacked sheet to prevent flow of electrical current between the stacked metal sheets. The insulating coating may, for example, be a ceramic material.

As best seen in FIG. 4, the smart susceptor 18 is attached directly to the metal plates 28 of the lower tooling die. (The smart susceptor 20 seen in FIG. 2 is likewise attached directly to the metal plates of the upper tooling die.) In accordance with one implementation, the metal plates 28 are made of austenitic (non-magnetic) stainless steel. The stacked metal plates 28 can have a space 36 between them to allow the quenching fluid (gas or liquid) to have direct impingement against the surface of the heated susceptor 18. This spacing is dictated by the thickness and strength of the smart susceptor surface shell and the consolidation pressures used. In addition, the susceptors do not require an electrical connection to one another. The metal plates 28 are interleaved with dielectric spacers 30 except near the susceptor and in places that are needed to allow the quenching medium to flow to the susceptor. The same considerations apply to the upper tooling die and the susceptor attached thereto.

Preferably each induction coil 34 is fabricated from copper tubing which is lightly drawn. A lightly drawn condition of the tubing enables precision bending by numerically controlled bending machines. Numerically controlled bending of the tubes allows accurate placement of the tubing relative to the changing contours of the susceptors, thereby improving the degree to which the each susceptor is uniformly inductively coupled to the induction heater across the length and width of the susceptor. However, it should be understood that the methods disclosed herein can be employed also in cases wherein the susceptors are planar rather than concave/convex. Optionally, the coils 34 also remove thermal energy by serving as a conduit for a coolant fluid, such as water. After being bent and installed, the coils include straight tubing sections connected by flexible tubing sections. The flexible tubing sections connect the straight tubing sections and also allow the dies to be separated. The accurate placement of the tubing of the induction coils 34 promotes uniformity in the amount of heat generated by the magnetic flux field and the amount of heat removed by flow of the coolant.

As disclosed in U.S. Pat. No. 6,528,771, the induction coils 34 can be connected to a temperature control system that includes a power supply, a controlling element, a sensor and a fluid coolant supply preferably containing water (not shown). The power supply supplies an alternating current to the induction coils 34 which causes the coils to generate the electromagnetic flux field. The controlling element receives the sensor output and uses the measurements in a feedback loop to adjust the power being supplied by the power supply. The controlling element can include hardware, software, firmware, or a combination thereof that is capable of using feedback to adjust the voltage output by the power supply.

The system described with reference to FIGS. 1-4 can be enhanced to increase the speed and efficiency for fabricating high-quality composite pre-form components by independently pre-heating the pre-form and the matched forming surfaces of the molding tool (including the smart susceptors) using inductive heating, such that when the pre-form is positioned in the molding tool, the pre-form and the forming surfaces of the molding tool are at the desired processing temperature (i.e., no further heating is required) for consolidation and molding, and lower molding pressures may be used. This permits rapid fabrication of composite components with higher fiber content and thinner walls, and thus permits for more complex components. It has been determined that the time it takes to pre-heat a pre-form can be substantially decreased by integrating smart susceptor wires or rods (referred to herein as "wires") into the pre-form and using inductive heating to heat the susceptor wires. It has also been determined that the time it takes to pre-heat the molding tool can be substantially decreased by using a flux guidance shell positioned over the smart susceptors to guide magnetic field (or flux) lines that pass through the susceptors to be substantially parallel to the forming surfaces of the molding tool. As a result, the pre-form and the molding tool are rapidly pre-heated in a controlled manner in seconds rather than minutes, and the pre-form may then be rapidly consolidated and molded in the molding tool in seconds rather than minutes even when a low molding pressure is applied.

Figure 5A:
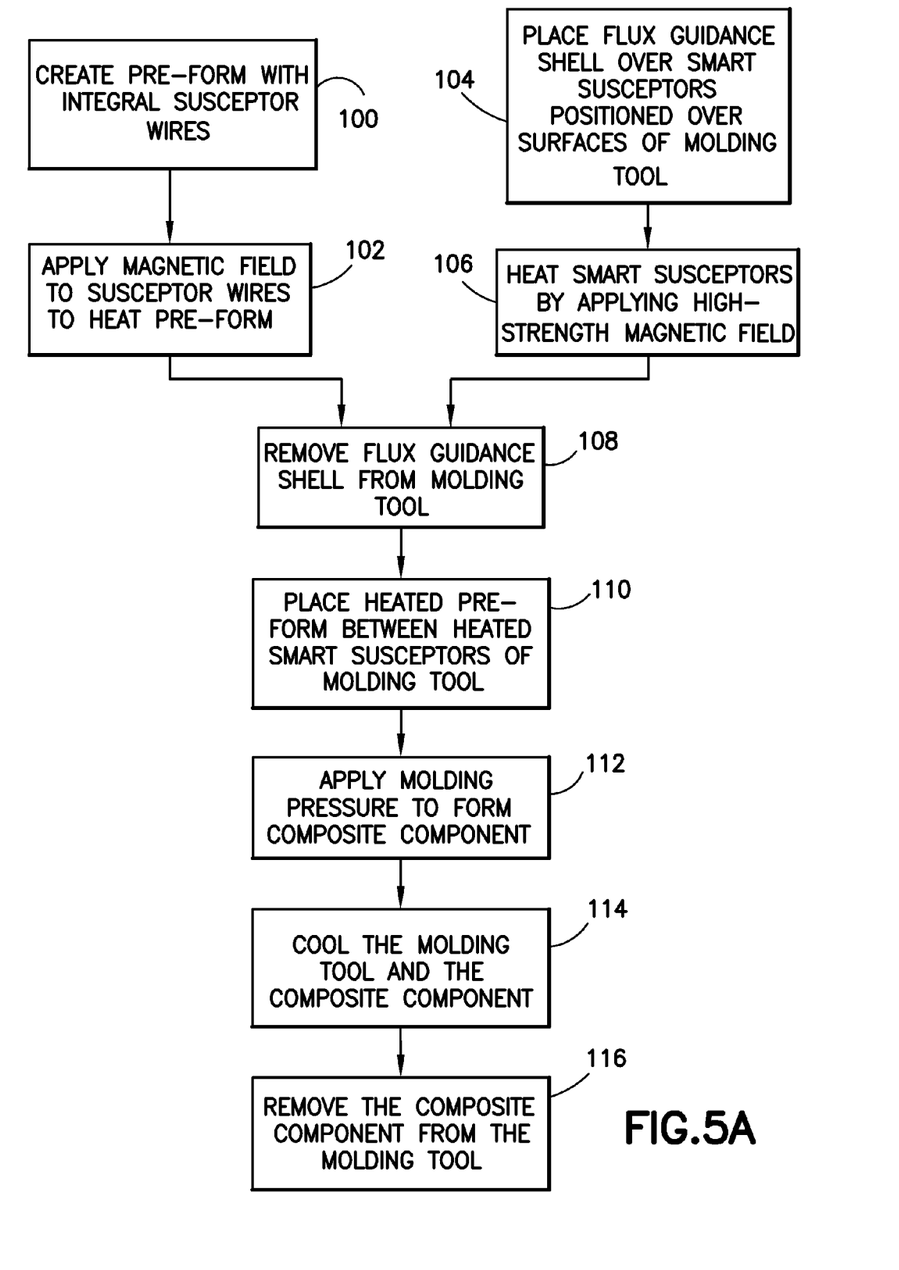
FIG. 5A is a flow diagram showing an induction process for fabricating thermoplastic composite components from pre-forms in accordance with one embodiment.
Figure 5B:
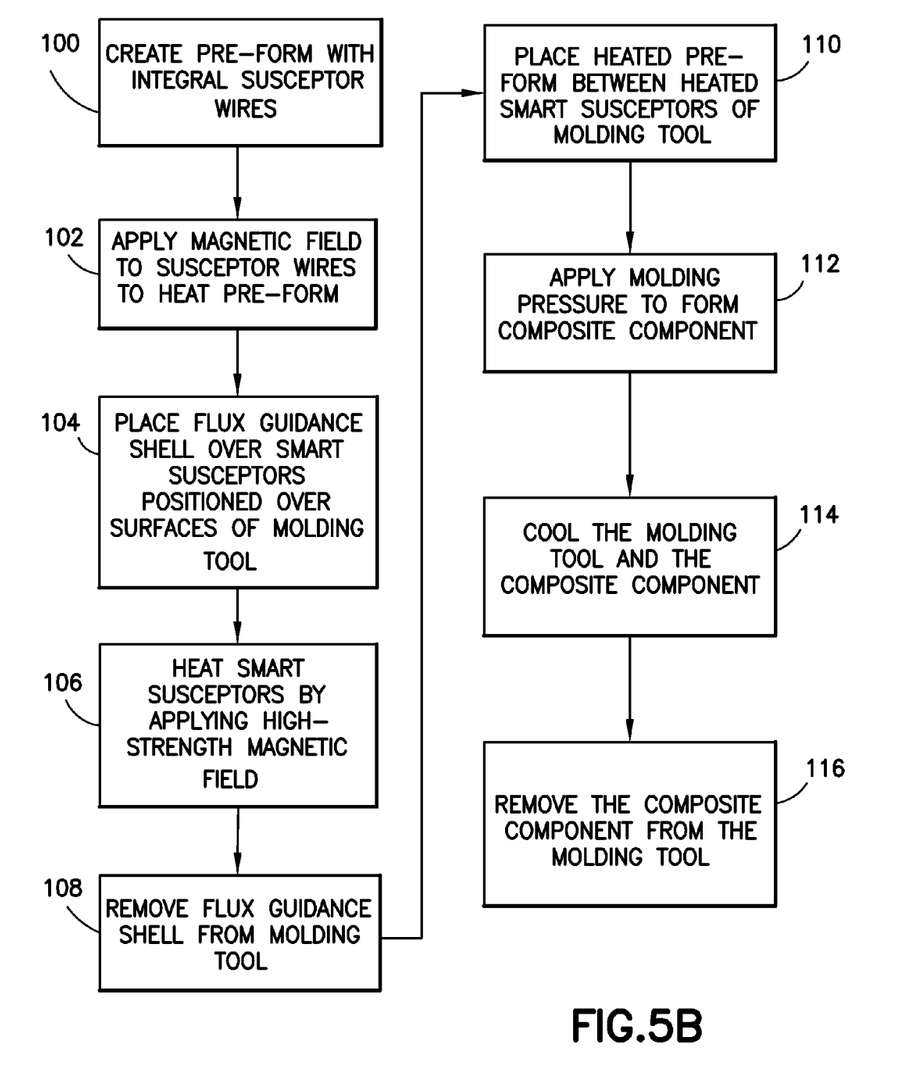
FIG. 5B is a flow diagram showing an induction process for fabricating thermoplastic composite components from pre-forms in accordance with another embodiment.

FIGS. 5A and 5B are flowcharts showing alternative induction molding processes for rapidly forming, consolidating and molding fiber reinforced thermoplastic composite pre-forms. In both methods, the pre-form and the molding tool are independently pre-heated such that a heated pre-form may be placed between heated smart susceptors of the molding tool. FIG. 5A shows a method wherein the independent pre-heating of the pre-form and the molding tool is done concurrently; and FIG. 5B shows a method wherein pre-heating of the pre-form and the molding tool occur sequentially. Other methods may be used, provided that a heated pre-form is placed into a pre-heated molding tool.

In step 100, a thermoplastic composite pre-form is created or formed with integral susceptor wires that are used to rapidly heat the pre-form and may also be used for supporting the pre-form during heating and transporting the pre-form from a forming station to a heating station and to the molding tool. Any method of forming a lofty mat of fibers that is capable of being moved from one place to another may be used.

Thermoplastic fibers that may be used in the pre-form comprise polypropylene, nylon, polyetheretherketone (PEEK), polytherketoneketone (PEKK), polyphenphlene sulfide (PPS), or combinations thereof. Other fibers may be used depending on the desired application for the molded component. The fibers may be, but are not required to be, reinforced with fiberglass, graphite, or other types of reinforcing materials, such as resin yarn.

Smart susceptor wires comprise magnetically permeable materials of the type that becomes non-magnetic when heated above the Curie temperature of the material. When heated above the Curie temperature, the heating in the material slows dramatically. Preferred magnetically permeable materials for constructing the smart susceptor wires used for pre-heating the pre-form include ferromagnetic materials that have at least a 10-fold decrease in magnetic permeability when heated to a temperature of the Curie temperature or higher. Such a large drop in permeability promotes temperature control of the susceptor and, as a result, temperature control of the pre-form. Ferromagnetic materials include iron, cobalt, nickel, gadolinium and dysprosium, and alloys thereof.

The particular material composition of smart susceptor wires is selected to produce a set temperature point, referred to herein as the leveling temperature, to which the susceptor is heated in response to the electromagnetic energy generated by the induction heating coil. The smart susceptor wires should be selected to have a leveling temperature that is roughly the same or slightly greater (up to 20° F. higher) than the desired processing temperature of the pre-form. The processing temperature is the optimal temperature for molding the selected pre-form material (or resin). This permits the pre-form to be placed into the molding tool at a temperature that is ready for consolidation and molding without the need for additional heating. The susceptor may be constructed such that the Curie point of the susceptor defines the leveling temperature to which the susceptor is inductively heated, or is higher than the leveling temperature. Examples of the type of materials that may be used as susceptor wires are shown in Table I.

TABLE I

| Material | Composition | Curie Temp (° F.) | Leveling Temp (° F.) | Resins |
|---|---|---|---|---|
| Kovar 29-17 | 54% Fe; 29% Ni; 17% Co; 0.3% Mn | 815 | 780-720 | PEEK |
| Moly-Permalloy | 80% Fe; 15% Ni; 5% Mo | 770 | 705-665 | PEEK and PEKK |
| Invar 42 | 58% Fe; 42% Ni | 716 | 620-570 | PPS |
| Invar 39 | 61% Fe; 39% Ni | 630 | 600-550 | PPS |
| Invar 36 | 64% Fe; 36% Ni | 539 | 460-410 | Polypropylene |
| DK510 | 40% Fe; 50% Ni; 10% Cr | 500 | 475-425 | Polypropylene |

The leveling temperature may tuned within the ranges shown in Table I by adjusting the frequency of the power supply and the diameter of the wires. Examples of power supply frequencies and corresponding diameters are shown in Table II.

TABLE II

| Power Supply Frequency | Wire Diameter |
|---|---|
| 0.06 KHz | 1.75 to 2.50 inches |
| 1 KHz | 0.125 to 0.500 inch |
| 10 KHz | 0.075 to 0.200 inch |
| 50 KHz | 0.025 to 0.100 inch |

Therefore, judiciously selecting the material and diameter for the susceptor wires and the power supply frequency permits the temperature of the susceptor wires to precisely controlled, and the heating of the pre-form to be rapid and efficient, even through the pre-form is a lofty material.

The smart susceptor may be formed in various shapes and sizes, including for example, in the form of wires or rods having a round, oval, square or rectangular cross-sections. The term wire, as used herein, includes all of the foregoing shapes and sizes.

The smart susceptor wires may be integrally formed into the pre-form during the formation process by layering susceptor wires between multiple layers of fibers, or by inserting the susceptor wires into the lofty mat after it has been formed. The susceptor wires should be present throughout the thickness of the pre-form to achieve rapid pre-heating of the pre-form, and preferably are stable enough to support the pre-form during pre-heating and transportation from the forming station to the pre-heating station to the consolidation and molding tool. For example, the susceptor wires should be approximately evenly spaced throughout the thickness of the pre-form, and comprise about 5% to 20% of the volume of the lofty mat. The susceptor wires may also be removable from the pre-form by pulling or sliding them out of the pre-form, such that the susceptor wires may be reused.

In a preferred embodiment, the susceptor wires are arranged in the shape of a pitchfork (of one or more layers), which provides the foregoing attributes. The thickness and the overall area of the pre-form will determine how sturdy the wire needs to be to achieve support and transport functions. If necessary, additional means may be used to achieve the support and transport functions.

In step 102, after the pre-form is formed with integral susceptor wires throughout the thickness of the pre-form, the pre-form is rapidly pre-heated to its processing temperature by applying a high strength magnetic field to the susceptor wires. For example, pre-heating in 20 seconds or less is desired. The magnetic field should have strength of about 500 to 10,000 amps per meter, and the frequencies of oscillation should be in the range of about 10 to 50 KHz to achieve the rapid induction pre-heating of the pre-form. The power needed to generate the magnetic field depends on the desired processing temperature and how massive the pre-form is, and could be in the range of about 5 to 200 watts per square inch.

Figure 6:
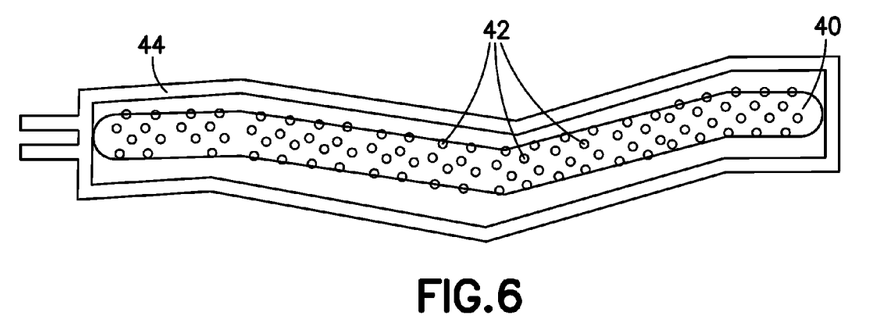
FIG. 6 is a diagram showing a sectional view of a pre-form with integrated smart susceptor wires positioned in an induction coil for pre-heating the pre-form.

FIG. 6 shows a cross-section view of a pre-form 40 with integral susceptor wires 42 after it has been transported to and placed into an induction or solenoid coil 44 for rapid pre-heating. In one embodiment, the smart susceptor wires 42 are used to hold the pre-form 40 in the induction or solenoid coil 44 during pre-heating. The magnetic field is generated by the solenoid coil 44, when it is energized, which induces current to travel circumferentially in the susceptor wires 42 and rapidly heat the susceptor wires as described above.

Other methods for heating a pre-form are available, such as an oven or heat lamp, but these methods would take 6-10 minutes to heat pre-form to the desired processing temperature. Using inductive heating of smart susceptor wires present throughout the thickness of the pre-form, the time for pre-heating a pre-form can be reduced to 20 seconds or less. In an alternative embodiment for molding aluminum or magnesium sheet metal, the sheet metal may be inductively pre-heated to a desired processing temperature without the use of the susceptor wires—placing the sheet metal in a solenoid coil is sufficient, and the remaining molding and cooling steps (described below) would remain the same.

In steps 104 and 106, the smart susceptors in the molding tool are pre-heated either concurrently with the pre-heating of the pre-form (FIG. 5A) or sequentially either before or after the pre-form is pre-heated (FIG. 5B). The same materials described above for use as the susceptor wires may be used to form the smart susceptor materials used in the molding tool, except they are formed into a layer or sheet instead of wires. The methods and system of this disclosure control the smart susceptors in the molding tool to also achieve the leveling temperature, which is roughly the same or slightly greater (up to 20° F. higher) than the desired processing temperature of the pre-form.

Figure 7:
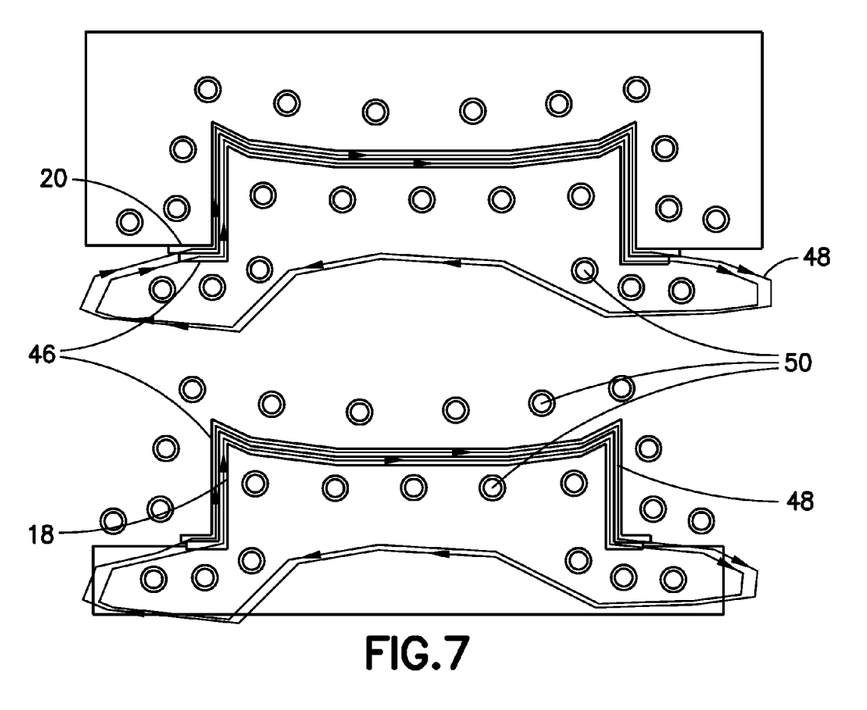
FIG. 7 is a diagram showing a flux guidance shell positioned over surfaces of smart susceptors positioned over upper and lower tool assemblies in their retracted positions during pre-heating, and induced magnetic flux fields guided by the flux guidance shell.

It has been determined that the time it takes to pre-heat the smart susceptors in the molding tool to the leveling temperature can be substantially reduced (from about 3 minutes to about 10-15 seconds) by adding a flux guidance shell over the susceptor during pre-heating. FIG. 7 shows the placement of such a flux guidance shell 46 over susceptors 18, 20 in their refracted positions. The flux guidance shell 46 shapes the magnetic flux 48 generated by the induction coil 50 such that the flux lines 48 flow substantially parallel to the forming surfaces of the mold, as shown for example in FIG. 7. The flux guidance shell 46 permits the application of high current in the coils, which generates a high strength magnetic field to speed up the heating process, and avoids transverse flux and the uncontrolled heating it produces. The strength of the magnetic field may be about 5,000 to 50,000 amps per meter, and the frequencies of oscillation may be in the range of about 0.5 to 10 kHz (e.g., 1 kHz) to rapidly and inductively pre-heat the smart susceptors in the molding tool.

Preferred materials for the flux guidance shell include ferromagnetic materials that pull in the flux lines, electrically conductive materials that permit current to flow and create a barrier to the magnetic flux forcing the field lines to move in a direction substantially parallel to the forming surfaces, or ferrite materials that are magnetic but not electrically conductive. Such materials may be provided in roll form or in block form and milled to the appropriate shape and thickness. The thickness of the flux guidance shell 38 may be in the range from about 0.050 to 2.5 inches depending on the material used, which may include, for example, copper or aluminum (which are conductive), steel laminates (which are ferromagnetic), solid steel (which may be conductive or ferromagnetic) or Oxide (which is a Ferrite material), as shown in Table III.

TABLE III

| Material | Method | Thickness | Curie Temp (° F.) | Magnetic Permeability |
|---|---|---|---|---|
| Copper | Conductive | .050" to 0.5" | n/a | 1 |
| Aluminum | Conductive | .050" to 0.5" | n/a | 1 |
| Steel Laminates | Ferromagnetic | .250" to 2.5" | 1,400 | 500-200 |
| Solid INVAR or Steel | Conductiver/ Ferromagnetic | .100" to 1.0" | 450 to 1,414 | 200-100 |
| Oxide 2 | Ferrite | .250" to 2.5" | 1,400 | 200-100 |

The molding surfaces of the induction tool are pre-heated by placing the flux guidance shell on top of the susceptors or attaching the flux guidance shell to upper and lower tool dies by means of clamps, fasteners or other known means (not shown in FIG. 7). The upper and lower tool dies are then moved toward each other to their extended tool-closed positions. High power alternating current is supplied to the induction coils by a power supply (not shown). The current generates high-strength magnetic field in the coils having a magnetic flux that passes through surfaces of the smart susceptors, which is then shaped by the flux guidance shell as described above.

In step 108, when the smart susceptors have reached the leveling temperature during the pre-heating process (after about 10-15 seconds), actuators move the tool dies apart to their retracted positions to allow removal of the flux guidance shell before the pre-form is positioned in the molding tool. The flux guidance shell is removed and may be reused.

In step 110, the pre-heated pre-form is placed between the pre-heated smart susceptors of the molding tool. The susceptor wires 42 may be used for transporting the pre-form and placing it into a position between the pre-heated susceptors. Other transporting means may be used together with or in place of the susceptor wires. The space inside the tool that surrounds the pre-form may be flooded with an oxygen-free gas (e.g., hydrogen or nitrogen) to eliminate oxide formation during heating. The susceptor wires 42 may be removed from the pre-form after the pre-form is placed in the mold and prior to molding; or the susceptor wires may be left in the pre-form, such that the wires become part of the molded component. Leaving the susceptor wires in the pre-form during the molding process permits the susceptor wires to assist in heating the pre-form if additional heating is desired during the molding process.

Referring again to FIG. 1, in step 112, molding pressure is applied to the pre-form by actuators, which force the opposing tooling dies toward each other while the smart susceptors and the pre-form are sandwiched therebetween. In accordance with one embodiment, molding pressures in a range of 100 to 500 pounds per square inch (psi) are sufficient to consolidate and mold the pre-form into the composite component. Consolidation and molding is rapid and complete even while using low molding pressures. Prior processes require molding pressures in the range of 1,500 to 2,500 psi. Because the pre-form and the smart susceptors are pre-heated to the desired processing temperature, the molding pressure may be applied immediately to the pre-form and the time it takes to consolidate and mold the pre-form is very rapid, no more than about 10 seconds. No further heating is required. However, the induction coil may be energized again if further heating of the smart susceptors is desired during the molding process.

In step 114, the pre-form can be quenched by supplying a cooling medium to the back sides of the smart susceptors as described above. In the disclosed process, the pre-form may be cooled in 10-15 seconds by using water as the cooling medium. After quenching, for some materials it may be useful to complete the heat treatment by tempering the pre-form. Quenching and tempering are especially advantageous for ferrous-based components. In step 116, the molded composite component is removed from the molding tool. The molding tool may then be prepared to fabricate another component by pre-heating the smart susceptors beginning again at step 104.

Figure 8:
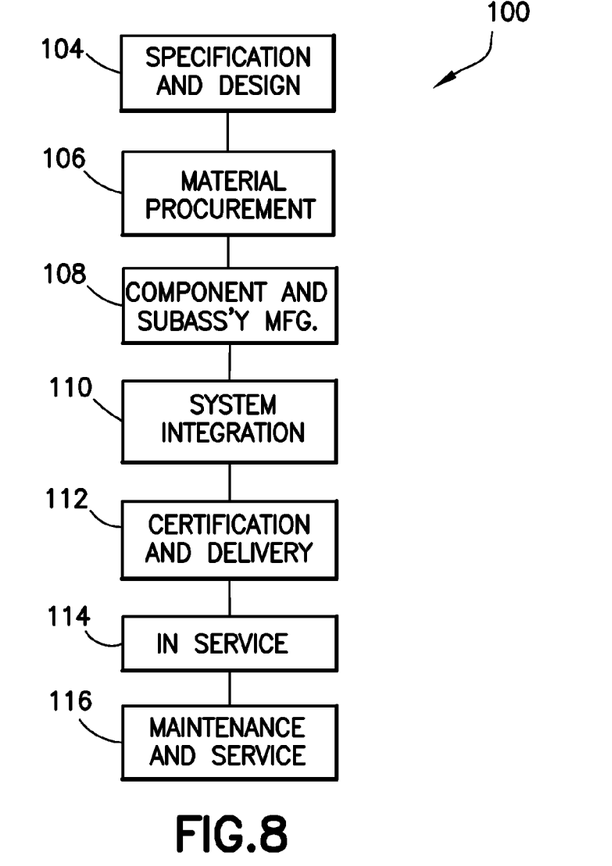
FIG. 8 is a flow diagram of an aircraft production and service methodology.
Figure 9:
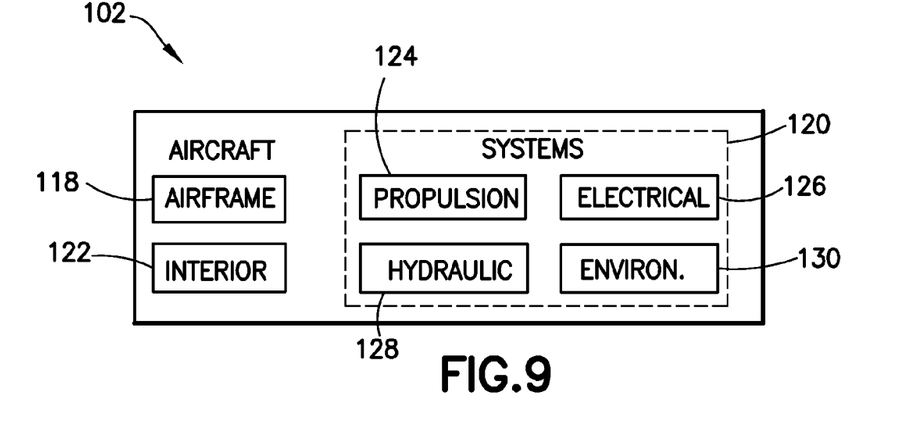
FIG. 9 is a block diagram of an aircraft.

Embodiments of this disclosure may be described in the context of an aircraft manufacturing and service method 100 as shown in FIG. 8 and an aircraft 102 as shown in FIG. 9. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

While the invention has been described with reference to certain exemplary embodiments, such embodiments are for purposes of illustration and not limitation. It will be understood by those skilled in the art that various changes may be made and equivalents may be substituted for elements thereof without departing from the scope of the invention. In addition, many modifications may be made to adapt a particular situation to the teachings herein without departing from the essential scope thereof. Therefore it is intended that the claims not be limited to the particular embodiments disclosed. The method claims set forth hereinafter should not be construed to require that the steps recited therein be performed in alphabetical order or in the order in which they are recited, and should not be construed to exclude two or more steps being performed contemporaneously during at least a portion of the duration of one of said steps.

We claim:

1. A method for fabricating a thermoplastic composite component, the method comprising:
   inductively heating a thermoplastic pre-form with a first induction coil to a processing temperature by inducing current to flow in susceptor wires removably disposed throughout the pre-form;
   inductively heating smart susceptors in a molding tool to a leveling temperature with a second induction coil;
   placing the heated pre-form between the heated smart susceptors;
   removing the susceptor wires by pulling or sliding out of the heated pre-form; and
   applying molding pressure to the heated pre-form to form the composite component.

2. The method of claim 1, wherein the susceptor wires are arranged throughout the pre-form in the shape of a pitchfork.

3. The method of claim 1, wherein the susceptor wires are inductively heated with the first induction coil to the leveling temperature.

4. The method of claim 3, wherein the leveling temperature is roughly equal to or up to 20° F. greater than the processing temperature.

5. The method of claim 1, wherein the pre-form is inductively heated to the processing temperature in less than 20 seconds.

6. The method of claim 1, wherein the current is induced in the susceptor wires by applying a magnetic field having a strength of about 500 to 10,000 amps per meter.

7. The method of claim 1, wherein the molding pressure is in a range of 100 to 500 pounds per square inch.

8. The method of claim 1, wherein inductively heating the smart susceptors in the molding tool comprises applying a high-strength magnetic field having a magnetic flux that passes through surfaces of the smart susceptors and shaping the magnetic flux to flow substantially parallel to a molding surface of the smart susceptors.

9. The method of claim 8, wherein shaping the magnetic flux comprises placing a flux guidance shell over the smart susceptors while the smart susceptors are inductively heated.

10. The method of claim 9, wherein the flux guidance shell comprises a material selected from the group consisting of conductive materials, ferromagnetic materials, materials that are conductive and ferromagnetic, and ferrite materials.

11. The method of claim 9, further comprising removing the flux guidance shell from the smart susceptors prior to placing the heated pre-form between the smart susceptors.

12. The method of claim 8, wherein the strength of the high-strength magnetic field applied to the smart susceptors is in the range of 5,000 to 50,000 amps per meter.

13. A method for fabricating a thermoplastic composite component, the method comprising:
- pre-heating a thermoplastic pre-form to a processing temperature by induction heating of susceptor wires removably disposed throughout the pre-form;
- pre-heating smart susceptors in a molding tool to a leveling temperature by applying a high-strength magnetic field having a magnetic flux that passes through surfaces of the smart susceptors and shaping the magnetic flux to flow substantially parallel to a molding surface of the smart susceptors;
- placing the pre-heated pre-form between the pre-heated smart susceptors;
- removing the susceptor wires by pulling or sliding out of the pre-heated pre-form; and
- applying molding pressure to the pre-heated pre-form to form the composite component.

14. The method of claim 13, wherein shaping the magnetic flux comprises placing a flux guidance shell over the smart susceptors while the smart susceptors are pre-heated.

15. The method of claim 14, wherein the flux guidance shell comprises a material selected from the group consisting of conductive materials, ferromagnetic materials, materials that are conductive and ferromagnetic, and ferrite materials.

16. The method of claim 14, further comprising removing the flux guidance shell from the molding tool prior to placing the heated pre-form between the smart susceptors.

17. The method of claim 14, wherein the smart susceptors are pre-heated to the leveling temperature in about 10-15 seconds.

18. The method of claim 14, wherein the molding pressure is in a range of 100 to 500 pounds per square inch.

19. The method of claim 13, wherein the strength of the high-strength magnetic field applied to the smart susceptors is in the range of 5,000 to 50,000 amps per meter.

20. A method for fabricating a thermoplastic composite component, the method comprising:
- forming a thermoplastic composite pre-form with susceptor wires removably disposed throughout the pre-form;
- positioning the pre-form in a first induction coil to induce current in the susceptor wires and inductively pre-heating the pre-form;
- positioning first and second flux guidance shells in an induction molding tool comprising a first tooling die having a first die surface and a second tooling die having a second die surface, a first susceptor positioned on the first die surface, a second susceptor positioned on the second die surface, and an integrated induction coil, the flux guidance shells positioned over the first susceptor and the second susceptor;
- inductively pre-heating the first susceptor and the second susceptor to a leveling temperature with the first and second flux guidance shells positioned over the first susceptor and the second susceptor;
- removing the first and second flux guidance shells from the induction molding tool;
- placing the pre-heated pre-form between the pre-heated first susceptor and second susceptor;
- removing the susceptor wires by pulling or sliding out of the pre-heated pre-form; and
- applying molding pressure to the pre-heated pre-form to form the composite component.

* * * * *